United States Patent [19]

Castagna

[11] 4,061,694

[45] Dec. 6, 1977

[54] LOW TEMPERATURE IMPACT STRENGTH MOLDING COMPOSITIONS

[75] Inventor: Eugene Gennaro Castagna, Clark, N.J.

[73] Assignee: Dart Industries Inc., Los Angeles, Calif.

[21] Appl. No.: 753,060

[22] Filed: Dec. 21, 1976

[51] Int. Cl.$^2$ .................. C08F 297/08; C08F 8/06; C08F 8/50
[52] U.S. Cl. .................................................. 260/878 B
[58] Field of Search ...................................... 260/878 B

[56] References Cited

U.S. PATENT DOCUMENTS

| | | | |
|---|---|---|---|
| 3,144,436 | 8/1964 | Greene et al. | 526/914 |
| 3,341,621 | 9/1967 | Hagemeyer, Jr. et al. | 260/878 B |
| 3,349,018 | 10/1967 | Potts | 260/878 B |
| 3,911,052 | 10/1975 | Castagna et al. | 260/878 B |

*Primary Examiner*—Alan Holler
*Attorney, Agent, or Firm*—Margareta LeMaire; Bryant W. Brennan; Fred S. Valles

[57] ABSTRACT

Polypropylene molding compositions of improved impact strength are obtained by subjecting certain block copolymers of ethylene and propylene to controlled oxidative degradation.

14 Claims, No Drawings

LOW TEMPERATURE IMPACT STRENGTH MOLDING COMPOSITIONS

BACKGROUND OF THE INVENTION

Polypropylene of high crystallinity has a number of desirable properties that make it a versatile material among current thermoplastic materials. It exhibits high yield strength and rigidity, a high heat distortion temperature and good surface hardness. It is essentially unaffected by most chemicals at or near ambient temperature and is highly resistant to stress cracking. Good scratch and abrasion resistance result in attractive parts. Its impact strength at temperatures above room temperature is moderately good, but polypropylene becomes increasingly brittle at lower temperatures. The ASTM low temperature brittleness point of polypropylene is approximately 70° F. and the polymer becomes extremely brittle at low temperatures, such as at 32° F.

Polypropylene has been used for the manufacture of shaped articles but some of its inherent deficiencies have unfortunately limited its use in many applications for which it would otherwise be well suited. For example, its low impact strength, i.e. high shock sensitivity, at extremely low temperatures is a disadvantage which has precluded its use for many extruded and molded items and in particular for rigid containers and packaging materials. Solid polypropylene is recognized in the plastic industry as possessing great commercial potential because it is superior in several respects to polyethylene, for example, polyproplylene has a higher melting point, lower density and greater stiffness than does polyethylene, which latter material is considered unsuitable for injection molding of certain items such as luggageware, dishwasher proof kitchenware, battery cases, etc.

Very little published data are available on the lowest temperature that different polypropylene compositions will sustain without fracture in standard tests. Some data are available on impact strengths at 0° and 23° C. While these data show that the impact strength decreases markedly as the temperature is lowered, it does not reveal the critical low temperature brittleness point by standard test or imply whether or not molded items will sustain rough handling at more extreme temperatures, such as at −10° F (−23° C) and below.

Attempts to improve the low temperature impact resistance of polypropylene have been made by addition of rubbery materials such as synthetic rubbers, polyisobutylene or amorphous ethylene/propylene random copolymers to polypropylene. The improvements have been minor, since they have been accompanied by less stiffness, lower stability and surface dullness. Also, sever difficulties are encountered in preparing intimate blends of the above mentioned compounds, the rubber material being present as chunks or discrete particles in the extruded blend.

Polypropylene has also been chemically modified by the addition of blocks of either ethylene homopolymer or ethylenepropylene random copolymers to the polypropylene as a means of improving impact strengths at normal and low temperatures.

However, there is a limit to the improvement in impact strength that can be attained by the formation of such block copolymers, since an increase in the amount of ethylene based block in the composition causes a corresponding decrease in the melt flow of the polymer. The net result is that there is a maximum proportion of block that can be incorporated into the polypropylene in order to maintain a melt flow of the composition that renders it suitable for molding, and this maximum proportion is generally insufficient to increase the impact strengths to the desired ranges.

Various polyblends of such ethylene-propylene block copolymers or ethylene-propylene random copolymers with polyethylene and/or polypropylene have been disclosed in the art as a further means of improving the impact strength especially at low temperatures. Although there has been reported favorable results in attaining the desired improvement in impact strength by these blending techniques, there are many disadvantges thereto which often precludes the successful commercialization of such polyblends. For instance, inventory problems, quality control problems, delivery problems, etc. all become more complicated the more components are incorporated in the composition. Also, difficulties are often encountered in preparing completely homogeneous blends resulting in considerable variations in product quality.

A need therefore still exists in the art for a simple polypropylene composition which retains the high tensile strenth and rigidity which is associated with polypropylene, but which has a high impact resistance at very low temperatures while possessing melt flow in the commercially desired ranges.

THE INVENTION

In accordance with the invention there is provided a polypropylene molding resin possessing exceptional low temperature impact strength, which resin is prepared by a process comprising I. providing a block copolymer having a melt flow rate in the range of from about 0.5 to about 1.5 grams per 10 minutes at 230° C and containing
  a. from about 60 to about 95 percent by weight of a polypropylene block, and
  b. from about 5 to about 40 percent by weight of a block of a random copolymer of ethylene and another α-olefin, wherein the content of ethylene derived units in said random copolymer block ranges between 30 and 60 weight percent;

II. contacting said block copolymer with an oxygen containing compound selected from air, elemental oxygen, inorganic peroxide, organic peroxide, or mixtures thereof; melting and working the mixture of oxygen containing compound and block copolymer in a high shear zone to subject the mixture to substantial oxidative degradation, and, III. recovering a polymer product having a melt flow rate which is higher than that of the block copolymer provided in Step I.

The block-copolymer useful in this invention is one containing on the average from about 60 to about 95 percent by weight of a polypropylene block, which can contain a small amount of units derived from another α-olefin, e.g. ethylene, and from about 5 to about 40 percent by weight of a block of a random copolymer of ethylene and another α-olefin monomer, such as propylene. Preferably the random copolymer block should represent on the average from about 20 to about 30 percent by weight of the total copolymer. The concentration of ethylene derived units in the random copolymer block should generally range between about 30 to about 60 weight percent. The most preferred ethylene content ranges between about 40 and 50 weight percent.

The block copolymer component is suitably prepared by a modification of the technique disclosed in U.S. Pat. No. 3,702,352, i.e., by a sequential polymerization process wherein a polypropylene preblock, containing from 0 to about 5 mole percent another α-olefin having from 2-8 carbon atoms, e.g. ethylene, is formed by polymerization in bulk or in a hydrocarbon diluent to form a slurry, said polymerization being carried out at elevated pressures in the presence of catalytic quantities of a catalyst formed by admixing a subhalide of a metal selected from the group of metals of Groups IVa, Va and VIa of the Periodic Table according to Mendeleef and an aluminum compound containing at least one carbon to metal bond. Suitable operating conditions include pressures in the range from about 150 to 800 psig and temperatures in the range from about 50° to about 250° F. After such polymerization to a solids content of from 10 to 60 percent by weight but preferably from 30 to 50 percent by weight, the preformed polymer slurry is introduced to a low pressure zone such as a cyclone or a bag filter-cyclone combination wherein volatile hydrocarbon constituents are flashed from the polymer to thereby obtain a substantially dry preformed polymer (i.e. containing no more than 5 percent by weight of volatiles) followed by introducing this preformed polymer which still contains active catalyst residues into a continuously agitated vapor phase reaction zone maintained at pressures of from 0 to 100 psig and temperatures of from about 60° to 195° F and introducing a mixture of ethylene and another α-olefin, preferably propylene, into said continuously agitated reaction zone and reacting the mixture in vapor phase to form a block of random-copolymer of ethylene and α-olefin onto the preblock to an extent of from 5 to about 40 percent by weight based on the total weight of the block copolymer. The vapor phase reaction zone contains at least one but preferably two reactors in series each containing agitating means such as paddles or ribbon blades.

Although catalytic materials which have heretofore been indicated as useful include a metal subhalide from the Groups IVa, Va and VIa of the Periodic Table according to Mendeleef, for example, titanium trichloride and the subhalides of vanadium, zirconium, thorium, etc., the preferred Group IVa metal is titanium trichloride and more specifically titanium trichloride cocrystallized with aluminum chloride according to the formula $nTiCl_3 \cdot AlCl_3$, where $n$ is a number from 1 to 5. As activators for the titanium trichloride the aluminum compounds containing at least one carbon to metal bond are preferred. Examples of such compounds are trialkyl aluminums wherein the alkyl groups contain from 1 to 10 carbon atoms, but preferably aluminum triethyl or dialkyl aluminum monohalides, wherein the alkyl groups contain from 1 to 10 carbon atoms and the halide is chlorine. The amount of catalyst ranges from 0.01 to 10 weight percent of the liquid monomer or diluent in the prepolymerization zone. The mole ratio of aluminum to titanium ranges from 0.01:1 to 3:1, preferably from 0.05:1 to 0.5:1.

The organo-aluminum-TiCl$_3$ catalyst system can also be modified by addition of an electron donor (Lewis base) as a third component. Examples of such electron donors are phosphines, phosphine oxides, phosphites, phosphates, phosphoric amides, amines, amides, imides, lactams, heterocyclic compounds, ethers, ketones, aldehydes, esters, lactones, silicates, siloxanes, sulfides, thiols, thiophenols, thioesters, thiophosphites, etc.

Also, any one of the recently developed high efficiency polypropylene catalysts can be used in the polymerization reaction.

Polymer chain regulators such as hydrogen, etc. are usually added to the preblock polymerization reaction mixture and in sufficient quantities to provide a melt flow rate of the final polymer not exceeding 1.5 g/10 min. at 230° C prior to degradation. Preferably the melt flow rate of the copolymer should range between about 0.6 to 1.3.

The block copolymer is subsequently deashed by any conventional treatment, e.g. by the method of U.S. Pat. No. 3,415,799 for inactivation and removal of catalyst residues and removal of highly amorphous polymer. Such deashing procedures include treatment of the crude polymer with alcohols or mixtures of alcohols and hydrocarbons, such as heptane and an aliphatic alcohol of 1 to 4 carbon atoms, at suitable temperatures followed by separation of the polymer from the volatiles, e.g. by centrifugation or filtration. Residual volatile constituents are then removed from the wet block copolymer in a drying zone containing preferably two dryers arranged in series. Although any dryers can be used, it is especially convenient to use jacketed ribbon blenders equipped with means for passing a sweep gas such as nitrogen therethrough. The drying is carried out at elevated temperatures below the tacky point of the polymer typically in the range from 200° to about 230° F. The major portion of the solvent is removed in the first dryer, such that the polymer entering the second dryer will typically contain from about 0.5 to about 2 percent by weight of solvent. The final block copolymer exiting the second dryer only contains trace quantities (less than 0.1 percent) of solvent.

The block copolymer is charged to the hopper of a high shear zone such as provided by an extruder. A condition of high shear is maintained within the extruder by heating the resin blend to a molten state with heating means associated with the extruder and working the melt in the annular zone between the extruder screw and the inner wall of the barrel of the extruder, as the melt passes through the extruder to the forming means or die which terminates the extruder.

Conventionally, propylene polymer extrusion is conducted in an inert atmosphere because of the susceptibility of the tertiary carbon to either thermal or oxidative cleavage. In the present invention, however, oxygen or an oxygen-containing gas, which most conveniently and economically can be air, is charged to the extruder together with the block copolymer resin. To avoid excessive oxidative degradation and to reduce safety hazards it is considered preferable to maintain the oxygen level within the extruder at less than about 1 percent by weight of resin. Most preferably, the oxygen level is maintained between about 0.5 to 0.95 percent by weight of resin. Typically, for an 8 inch diameter NRM commerical extruder, for example, air flow rates ranging from about 2 to 15 ft. 3/min. have been found suitable.

The extruder is operated so that the melt temperature of the resin within the barrel averages between about 350° to about 650° F., and preferably between about 400° and 550° F. Generally, propylene block copolymers exhibit a softening temperature of about 350° F. Under the operating conditions of the present invention, a melt temperature above about 550° F can result in polymers of such low viscosity that it becomes extremely difficult to maintain sufficient back pressure to keep the extruder in operation. The upper temperature limits can vary, however, depending upon the duration and extent of exposure to high shear rates. Thus, in commerical extruders, e.g., an 8 inch diameter NRM extruder, 550° F. is an effective upper limit; however, as the size of the extruder decreases, higher melt temperatures up to and including 650° F. can be suitably employed.

Alternately, the block copolymer can be degraded employing a mixture of peroxide and an oxygen containing gas as disclosed in U.S. Pat. No. 3,940,379, hereby incorporated by reference. In this process the block copolymer resin and inorganic or organic peroxide are charged to a blending zone. A blanket of an inert gas such as nitrogen, argon and the like is maintained within the blending zone by feeding the inert gas to said zone. The peroxide is uniformly blended with the resin by means of an agitator, paddle, blade or the like within the blending zone. Although it is not considered strictly necessary to maintain the blending zone under an inert blanket, use of an inert gas is considered preferably for safety reasons. If desired, the blending of the resin and peroxide can be effected upon admixture of the components during the extrusion operation.

Any inorganic or organic peroxide can be employed in the process. Illustrative of the peroxides which can be suitably employed are hydrogen peroxide, dicumyl peroxide, t-butyl peroxy isopropyl carbonate, di-t-butyl peroxide, p-chlorobenzoyl peroxide, dibenzoyl diperoxide, t-butyl cumyl peroxide, t-butyl hydroxyethyl peroxide, di-t-amyl peroxide, 2,5-dimethylhexene-2,5-diperisononanoate and the like. The peroxide can be blended with the copolymer resin in amounts varying from about 0.01 to 0.1 percent by weight of resin. At these levels, residual peroxide odor is not considered objectionable. Preferably, the peroxide concentration ranges from 0.015 to 0.05 percent by weight of resin. Most preferable, high boiling, low odor peroxides, such as, t-butyl peroxy isopropyl carbonate are used. At peroxide concentrations below about 0.01%, no significant difference in melt flow rate, as compared to the use of air alone, is effected. At peroxide concentrations above 0.1%, excessive oxidative degradation can occur resulting in a resin product of extremely low viscosity which severely hampers the extrusion process. The resulting peroxide/block copolymer blend is then treated in an extruder with an oxygen containing gas in the manner as disclosed above.

Upon egress of the degraded resin from the extruder, it can be cooled and further processed in conventional manner. For example, the extrudate can be passed through a water bath and then pelletized.

The process is easily controlled and yields products of melt flow rates which are suitable in subsequent molding operations. Improvement in low temperature impact strength is obtained when the degradation is controlled to result in at least a doubling of the melt flow rate of the polymer. Typically, the final melt flow rate is maintained in a range between about 2 and about 10 grams per 10 minutes, although for certain applications it might be desirable to degrade the resin to an even higher melt flow rate, such as 15 grams per 10 minutes.

It was completely unexpected to find that a block copolymer, which has been degraded to a desired higher melt flow rate, exhibits much greater impact strengths, especially at low temperatures, than those of a similar but nondegraded block copolymer produced under conditions to yield the same higher melt flow rate. This is actually completely contrary to what could be expected from previous experiences with other polymers, including propylene homopolymer. As a general rule, the higher the melt flow rate the lower the impact strength of these polymers, and when a polymer of low melt flow rate is degraded to a higher melt flow rate, the degradation is accompanied by a lowering in impact strength. This is illustrated by the data in Table 1 obtained on propylene homopolymers:

Table 1

| Resin | Relationship Between Melt Flow Rate And Izod Impact Strength | | | |
|---|---|---|---|---|
| | A | B | C | D |
| MFR g/10 min.[1] | 0.9 | 2.4 | 3.7 | 4.9[3] |
| Notched Izod,[2] ft.lbs/inch | 1.0 | 0.7 | 0.6 | 0.6 |

[1]ASTM D-1238
[2]ASTM D-256
[3]Degraded Resin B

The degraded block copolymers of this invention are particularly useful resins for the production of molded objects, which may at least periodically be exposed to very low temperatures, e.g., in winter shipments, outdoor use, freezer-use, etc.

The following example further illustrates the invention. Unless otherwise stated, all percentages and parts are by weight.

EXAMPLE

Two polypropylene block copolymer resins were prepared each to contain about 75% of a propylene homopolymer preblock and about 25% of a propylene-/ethylene random copolymer postblock containing about 45% of polymerized ethylene. One of the resins had a melt flow rate of about 0.9 g/10 min. and the other 3.5 g/10 min. The low melt flow rate resin was degraded to a melt flow rate of 3.9 g/10 min. by charging it to the sealed hopper of an 8 inch NRM extruder. Air was charged to the hopper at the rate of 1 to 2 ft. 3/min. and the extruder was operated to maintain a melt temperature of 400°-500° F. The mixture was extruded through 80 mesh screen packs to a die head adapted to form strands of resin. The strands were cooled upon passage through a water bath and fed to a pelletizer.

The 3.5 melt flow resin was extruded without degradation and pelletized. Physical testing of the degraded and non-degraded resins gave the results shown in Table 2.

Table 2

| Resin | De-graded | Non-degraded |
|---|---|---|
| MFR - g/10 min.[1] | 3.9 | 3.5 |
| Notched Izod,[2] ft.lb/in. | 12.6 | 10.5 |
| Low Temperature[3] Brittleness, F 50 −° C | −30 | −6.7 |
| Tensile Modulus,[4] psi × 10³ | 146 | 141 |

[1]ASTM D-1238
[2]ASTM D-256
[3]ASTM D-746
[4]ASTM D-638

It is obvious to those skilled in the art that many variations and modifications can be made to the composition and process of this invention. All such departures from the foregoing specification are considered within the scope of this invention as defined by this specification and appended claims.

What is claimed is:

1. A polypropylene molding resin of improved low temperature impact strength obtained in a process comprising I. providing a block copolymer having a melt flow rate in the range of from about 0.5 to about 1.5 grams per 10 minutes at 230° C and containing
   a. from about 60 to about 95 percent by weight of a polypropylene block and
   b. from about 5 to about 40 percent by weight of a block of a random copolymer of ethylene and another α-olefin, wherein the content of ethylene derived units in said random copolymer block ranges between 30 and 60 weight percent, II. contacting said block copolymer with an oxygen containing compound selected from air, elemental oxygen, inorganic peroxide, organic peroxide, or mixtures thereof; melting and working the mixture of oxygen containing compound and block copolymer in a high shear zone to subject the mixture to substantial oxidative degradation, and III. recovering a polymer product having a melt flow rate which is higher than that of the block copolymer provided in Step I.

2. A polypropylene molding resin according to claim 1, wherein the polypropylene block is a preblock and the random copolymer block is a postblock.

3. A polypropylene molding resin according to claim 2, wherein the polypropylene block is a polypropylene homopolymer.

4. A polypropylene molding resin according to claim 2, wherein the polypropylene preblock is a random copolymer of propylene and no more than 5 mole percent of another α-olefin having from 2 to 8 carbon atoms.

5. A polypropylene molding resin according to claim 2, wherein the random copolymer postblock is a random copolymer of ethylene and propylene.

6. A polypropylene molding resin according to claim 5, wherein the content of ethylene derived units in said random copolymer postblock is between about 40 and about 50 weight percent.

7. A polypropylene molding resin according to claim 5, wherein the random copolymer postblock represents on the average from about 20 to about 30 percent by weight of the block copolymer.

8. A polypropylene molding resin according to claim 5, wherein the block copolymer of Step I has a melt flow rate in the range from about 0.6 to about 1.3 grams per 10 minutes.

9. A polypropylene molding resin according to claim 2, wherein the oxygen containing compound is air.

10. A polypropylene molding resin according to claim 2, wherein the temperature of the melt of Step II is maintained between about 350° F and about 650° F.

11. A polypropylene molding resin according to claim 2, wherein the temperature of the melt of Step II is maintained between about 400° F and about 550° F.

12. A polypropylene molding resin according to claim 2, wherein the oxygen containing compound is a mixture of gaseous oxygen and from about 0.01% and about 0.1% of a peroxide based on the weight of the block copolymer.

13. A polypropylene molding resin according to claim 2, wherein the melt flow rate of the recovered polymer product is at least double that of the block copolymer provided in Step I.

14. A polypropylene molding resin according to claim 13, wherein the melt flow rate of the recovered polymer product is between about 2 and about 10 grams per 10 minutes.

* * * * *